United States Patent Office 3,463,763
Patented Aug. 26, 1969

3,463,763
PROCESS FOR REACTIVATING POLYAMIDE
RESIN USED IN DIBITTERING CITRUS
JUICES
Francis P. Griffiths, Weslaco, Tex., assignor to the United States of America as represented by the Secretary of Agriculture
No Drawing. Original application Oct. 22, 1963, Ser. No. 318,128. Divided and this application June 2, 1967, Ser. No. 655,701
Int. Cl. B01d 15/06
U.S. Cl. 260—78        2 Claims

ABSTRACT OF THE DISCLOSURE

A process is provided for reactivating the resins, polyhexamethylene adipamide and polyvinylpyrrolidone, which have absorbed thereon the bitter ingredients removed as a result of the resin having been used in the debittering of citrus juice. The process comprises washing the resin in boiling water, further washing it in ethyl alcohol or a similar solvent, and then drying the washed resin at a temperature of about from 40° to 80° C.

---

This application is a division of application bearing Ser. No. 318,128, filed Oct. 22, 1963, now abandoned.

A nonexclusive, irrevocable royalty-free license in the invention herein described, throughout the world for all purposes of the United States Government, with the power to grant sublicenses for such purposes, is hereby granted to the government of the United States of America.

This invention relates to a partially or completely debittered grapefruit juice or navel orange juice and a process for improving the taste of citrus juices and controlling bitterness in the same.

It is well known that many people do not like grapefruit juice because of the bitter taste. This taste is due primarily to the presence of a compound called naringin and partially to poncirin and minor constituents. The bitterness which develops in navel orange juice, especially upon standing, is believed due to terpenoid compound.

Methods of reducing bitterness have been developed and are the subject of several patents and numerous articles in the literature. For example, bitterness may be reduced in extracted grapefruit juice by very rapid separation of the pulp, marc, and rag from the juice. Naringin and other bitter components, are present in greater concentrations in the albedo, septums and juice sac skins, than in the juice cell contents. Rapid separation or pulping with a minimum of extraction pressure enables the recovery of juice before equalization of bitterness has a chance to occur. A drawback to this system is that recovery or yield of juice is reduced because of the lower extraction pressures required.

Another method of reducing bitterness is by the use of an enzyme, naringinase, which splits the glycoside narinign to the less bitter aglycone, naringenin, and the sugars rhamnose and glucose. Difficulties with this system are the expense of the enzyme and the time and temperature control required for enzyme action.

Activated carbon or charcoal has been used to adsorb naringin and reduce bitterness. This process is more suited for the recovery of narringin from citrus wastes than for the production of a bland edible juice. Carbon is difficult to remove from juice and usually leaves an unsightly liquid. Carbon also absorbs a fairly large proportion of juice acids, vitamin C and sugars, and thus changes the basis composition of the juices.

Materials have been discovered and a procedure developed for selectively removing the bitter compounds in grapefruit juice and in navel orange juice and improving the flavor of other citrus juices without appreciably changing the sugar-acid ratio or causing a change in flavor or loss of vitamin C and other valuable constituents of the juice.

It has been found that grapefruit juice can be debittered by suspending polyamide resin (nylon) powder or polyvinyl pyrrolidone (Polyclar AT) resin in the juice, agitating for one to thirty minutes, then removing the polyamide or Polyclar resin by filtration or centrifugation. Another method for debittering is to pour the juice through a bed of coarse resin. Juice may be fresh or heat treated. Although it is not necessary to remove suspended cellular material from citrus juice prior to debittering, this is easy to accomplish by first centrifuging the juice. The cycle for this operation is to first centrifuge the juice, treat the supernatant liquid with sufficient resin to obtain the degree of debittering required, remove the resin by a second centrifugation, recombine the treated juice with the pulp or cloud removed by the first centrifugation. It has been found that juice so treated retains only a minor amount of bitterness, is bland, and has the natural color and flavors, acid and sugar of normal juice.

We have discovered that the degree of debittering of grapefruit juice and other citrus juices may be precisely controlled by regulating the amount of resin added to and subsequently removed from the juice. It is envisaged that this discovery will make possible the standardization or control of the bitterness level in, for example, commercial grapefruit juice in spite of natural or seasonal variations which now occur. Juice, for example, from early season or immature fruit, or from fruit which has been frozen, is much more bitter than that expressed from midseason or late season fruit. By treating the bitter juice with the resins and by the methods we have discovered and outline in this invention, it is possible to market a much more uniform product of a high level of acceptability.

Although the causes of bitterness which develop in navel orange juice on standing or processing are not well understood, it is believed this bitterness results from changes in the terpenoids contained in the juice. We have discovered that treatment of navel orange juice with polyamide resin or with polyvinyl pyrrolidone resins will remove constituents causing this bitterness and that a bland stable juice can thus be obtained.

It has also been discovered that certain citrus juices now considered unmarketable because of objectionable flavor can be improved by resin treatment to yield an acceptable juice. As an example, juice of the fruit of citrange, a trifoliate-sweet orange hybrid, has a bitter, resinous flavor which is removed by nylon, Polyclar AT or Ultramid resin treatment. Since citranges are remarkably cold hardy, production of an edible juice might extend the growing range of this type of citrus. The juice after treatment is an acceptable substitute for lemon juice.

It has been discovered that properly activated polyamide (nylon) and polyvinyl pyrrolidone resins (Polyclar AT) will selectively remove naringin, hesperidin, methyl hesperidin chalcone, and other citrus flavonoids from grapefruit juice, orange juice, orange peel juice and aqueous extracts of citrus peel or citrus wastes. By subsequent elution of the resin with alcohol or other appropriate solvents the naringin, hesperidin, or other flavanones may be removed from the resin in relatively pure and concentrated state.

We have discovered and include as a part of the invention that the resins may be reactivated or regenerated for repeated use by washing the used resin with boiling water, with ethyl alcohol, isopropanol, or with dilute alkali and then water or alcohol, and drying the washed resin at temperatures about from 40° to 80° C. (usually 60–80° C.). This reactivated resin can then be reused and has an adsorptive capacity approximately equal to that of the fresh unused resin.

It is recognized that resins vary greatly in adsorptive capacity for bitterness in citrus juices and that methods of preparing resins are factors affecting activity. It has been found that polyvinyl pyrrolidone polymers of various molecular weights have somewhat greater adsorptive capacity than polyamide (nylon) polymers.

Varying degrees of activity can also be obtained by varying the degree of subdivision of fineness upon precipitating the polymer from its solution. Methods of preparing active resins are well known to those skilled in the art and it is not the purpose of this invention to delimit types of resins or methods of activating the same, but to include as useful polyamide polymers and those polyvinyl pyrrolidone polymers and copolymers that are water insoluble, relatively inert and nontoxic. Polyvinyl pyrrolidone polymers (Polyclar AT) are, for example, permitted to be used in the brewing industry for the removal of haze (tennin-like materials) from beer.

An active polyamide resin may be prepared as follows: Ten grams of nylon 66 commercial molding resin beads are dissolved in 200 ml. of formic acid by boiling under reflux. Twenty to thirty grams of filteraid (i.e., Hyflo Super Cel) are suspended in 400 ml. of methyl alcohol. After the nylon is dissolved the methyl alcohol-Super Cel mixture is added rapidly to the formic acid-nylon solution and agitation is continued for a few minutes. The nylon precipitates on the filteraid in a highly active form. After cooling the nylon Super Cel precipitate is washed repeatedly with distilled water to remove acid and then dried at a temperature less than 80° C.

One gram of the above combination (or ⅓ gram nylon) will remove approximately 10 milligrams of naringin from 100 ml. of 0.100% naringin solution. The nylon-Super Cel combination is easily removable from suspension in citrus juice.

In laboratory trials of the action of polyvinyl pyrrolidone resin, 100 ml. amounts of 0.100% naringin solution lost 38 mg. in one trial and 41 mg. in another trial of naringin by adsorption on 1.0 g. of Polyclar AT powder during 10 minutes agitation at room temperature.

There are several known methods for preparing flavonoids from citrus, but the known methods are time consuming. Extracting the pulp or marc with dilute alkali or sodium carbonate solutions, then concentrating the extract, adding acid to bring the pH of the solution to 3 to 5, and allowing the extract to stand until the naringin precipitates out of solution is one method.

Another method: removing the flavonoid from aqueous solution by repeated extractions with a water immiscible solvent such as ethyl acetate, butyl alcohol, or ethyl ether, then distilling off the solvent, and recrystallizing the residue to obtain the naringin.

A more efficient, and less time consuming method of preparation of the flavonoids was gained in the labors of establishing a method of debittering the citrus juices. The flavonoids which are captured by the polyamide resins are collected readily by simply washing the filter with hot water. The flavanones have known utility in the food industry as flavoring additives.

The discovery that certain resins which are water insoluble, colorless, tasteless and nontoxic will selectively remove bitterness from grapefruit juice and other citrus juices is of wide application and it is not the purpose of this description of this invention to limit or rigidly define conditions of treatment or amounts or types of materials useful in these applications. The following examples will serve to show a range of possible methods and applications of this invention.

EXAMPLE 1

The following shows the use of the polyvinyl pyrrolidone resin (Poyclar AT powder) to debitter grapefruit juice. Four hundred milliliters of grapefruit juice containing by Davis test .047% naringin, was treated with 4.0 g. resin for 10 minutes. After removal of the resin by centrifuging, the residual juice contained .029% naringin as determined by the Davis test for naringin. The treated juice was bland and lacked the bitterness evident in the untreated control.

In a trial of the nylon-type resin, twelve grams of polyamide powder (Ultramid pulver) was applied on a filter pad and successive 100 ml. portions of previously centrifuged grapefruit juice (.082 Davis test) passed through it. The first and second 100 ml. portions were completely debittered as far as taste could determine, containing .01 and .02% maringin as measured by the Davis test. The third 100 ml. portion was incompletely debittered, mildly bitter by taste, and contained .042% naringin by Davis test.

EXAMPLE 2

The amount of debittering desired in grapefruit juice can be controlled by varying the amount of resin in contact with the juice. The following are cited as examples of such variation.

Previously centrifuged grapefruit juice having a high level of bitterness as measured by taste and Davis test (.085% naringin) was treated with polyvinyl pyrrolidone resin (Polyclar AT) in the ratio of 1 g. of resin to 100 g. of juice by suspending the resin and stirring for 10 minutes. After removal of the resin the juice had lost 36% of its naringin value (.054% naringin by Davis test) and was judged to be about one-half as bitter as the original juice. Another sample of the same juice was treated in the proportion of 3 g. of resin to 100 ml. of juice by stirring for 10 minutes and centrifuging to remove the resin. The treated juice then retained only .032% naringin (loss of 61.2%) and was judged not bitter when tasted. (Low levels of naringin are not detected by taste.) This reduction in bitterness was accomplished with appreciable change in flavor, acid or sweetness of the juice, as evidenced in the following data:

Original juice, naringin .085%; acid 1.30%; Brix 9.8°. Juice after treatment 1 g. Polyclar:Naringin .054%; acid 1.29%; Brix 9.8°. Juice after treatment 3 g. Polyclar: Naringin .032%; acid 1.28%; Brix 9.8°.

The small loss in acid, 1.30% to 1.28%, which occurred could have been avoided by first washing the resin with 1% citric acid and drying prior to use. However, the change in Brix/acid ratio, 9.8/1.30=7.5, to 9.8/1/28=7.6, is not detectable when the two juices are compared by tasting for sugar-acid only. Resin was pretreated to prevent a change in acidity, as follows. Ten grams of Polyclar AT resin were washed with 100 ml. of 1% citric acid, then with distilled water to remove excess acid, then dried in an oven at 60° C. Three grams of the dried resin reduced 100 ml. of juice from .082% naringin to 0.034% without change in the Brix of 10° and acid of 0.87% of the juice.

EXAMPLE 3

By percolation of the juice through a resin bed of sufficient depth complete or almost complete removal of naringin may be accomplished. After the resin is saturated with naringin (Polyclar AT powder will remove about 1.5% of ias weight of naringin) the resin may be regenerated by washing in boiling water, then alcohol, and drying at 60–80° C. and reused. The following is an example of this cycle.

One hundred ml. of grapefruit juice having a naringin value of .082% and a bitter taste was filtered through a bed of 9 grams of Polyclar AT resin. The filtrate was nonbitter and had a Davis value of .012% (70 mg. naringin removed). The resin powder was then boiled in hot water, the water filtered off, and the filter pad washed with 3 portions of ethyl alcohol and dried at 70° C.

The dried Polyclar AT powder was again used with another 100 ml. of grapefruit juice containing .082% naringin. The filtrate from this operation contained .010% naringin and was not bitter, identical in taste and flavor with the treated juice from the fresh resin.

EXAMPLE 4

Active polyamide (nylon) or polyvinyl pyrrolidone resins may be used to concentrate naringin, hesperidin, or other flavonoids from citrus for the subsequent recovery of these compounds. The following will serve as an example:

Boiling hot water was used to extract naringin from grapefruit peel. The hot extract was clarified by filtration through Hyflo Super Cel, then cooled and stirred with Polyclar AT resin. The saturated resin was removed from the extract, washed with a little cold water, then extracted with ethyl alcohol. The ethyl alcohol-naringin extract was reduced in volume nearly to dryness on a steam bath, hot water was added, and the water solution of naringin set in a cold room until naringin crystals could be recovered.

EXAMPLE 5

Juice expressed from fruit of citrange (trifoliate-sweet orange hybrid) was so resinous and bitter in flavor as to be unacceptable as a base for a sweetened diluted beverage. The juice was treated with 1.5% of its weight of nylon powder. After removal of the nylon powder, the "off" flavors of the citrange juice were absent and an acceptable drink was obtained by diluting and sweetening the juice.

I claim:

1. A process for reactivating a polyamide resin, selected from the group consisting of polyhexamethylene adipamide and polyvinylpyrrolidone, which has absored thereon the bitter ingredients removed as a result of its use in the debittering of citrus juices, comprising:
    (a) washing the resin in boiling water;
    (b) further washing the resin in ethyl alcohol or isopropanol; and
    (c) drying the washed resin at a temperature of about from 40° to 80° C. to obtain the resin free of said bitter ingredients.

2. A process for reactivating a polyamide resin, selected from the group consisting of polyhexamethylene adipamide and polyvinylpyrrolidone, which has absorbed thereon the bitter ingredients removed as a result of its use in the debittering of citrus juices, comprising:
    (a) washing the resin in boiling water;
    (b) further washing the resin in dilute alkali and then water or ethyl alcohol or isopropanol; and
    (c) drying the washed resin at a temperature of about from 40° to 80° C. to obtain the resin free of said bitter ingredients.

References Cited

UNITED STATES PATENTS

| | | | |
|---|---|---|---|
| 2,251,962 | 8/1941 | Sommaripa | 260—78 |
| 2,342,387 | 2/1944 | Catlin | 260—78 |
| 2,742,440 | 4/1956 | Stott et al. | 260—78 |
| 3,151,989 | 10/1964 | Sacks et al. | 260—78 |

HAROLD D. ANDERSON, Primary Examiner

U.S. Cl. X.R.

99—105; 260—88.3, 96